United States Patent
Singh et al.

(10) Patent No.: US 10,966,243 B2
(45) Date of Patent: Mar. 30, 2021

(54) FLEXIBLE RESOURCE USAGE BETWEEN SCHEDULING-BASED AND CONTENTION-BASED RESOURCE ACCESS FOR WIRELESS NETWORKS

(71) Applicant: NOKIA SOLUTIONS AND NETWORKS OY, Espoo (FI)

(72) Inventors: Bikramjit Singh, Espoo (FI); Olav Tirkkonen, Helsinki (FI); Zexian Li, Espoo (FI); Mikko Aleksi Uusitalo, Helsinki (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/331,895

(22) PCT Filed: Sep. 23, 2016

(86) PCT No.: PCT/EP2016/072662
§ 371 (c)(1),
(2) Date: Mar. 11, 2019

(87) PCT Pub. No.: WO2018/054478
PCT Pub. Date: Mar. 29, 2018

(65) Prior Publication Data
US 2020/0077436 A1    Mar. 5, 2020

(51) Int. Cl.
*H04W 74/02* (2009.01)
*H04L 12/26* (2006.01)
(Continued)

(52) U.S. Cl.
CPC ......... *H04W 74/02* (2013.01); *H04L 43/0894* (2013.01); *H04W 24/08* (2013.01); *H04W 74/006* (2013.01)

(58) Field of Classification Search
CPC .............. H04W 72/042; H04W 24/08; H04W 72/1289; H04W 76/27; H04W 72/0446;
(Continued)

(56) References Cited

U.S. PATENT DOCUMENTS

2010/0014423 A1* 1/2010 Furuskar ............... H04W 74/02
370/235
2012/0014269 A1   1/2012 Ray et al.

OTHER PUBLICATIONS

International Search Report and Written Opinion for International Application No. PCT/EP2016/072662, dated Jun. 16, 2017; 11 pages.
(Continued)

*Primary Examiner* — Natasha W Cosme
(74) *Attorney, Agent, or Firm* — Brake Hughes Bellermann LLP

(57) ABSTRACT

A technique includes determining a number of available resources for a category of user devices, determining a number of user devices, within the category of user devices, that are connected to a base station, determining whether the number of available resources is greater than or equal to the number of connected user devices, allocating resources to one or more user devices within the category of user devices using a scheduling-based resource allocation if the number of available resources for the category is greater than or equal to the number of connected user devices within the category of user devices, and otherwise, allocating resources to one or more user devices within the category of user devices using a contention-based resource allocation if the number of available resources for the category is less than the number of connected user devices within the category of user devices.

13 Claims, 9 Drawing Sheets

(51) Int. Cl.
*H04W 24/08* (2009.01)
*H04W 74/00* (2009.01)

(58) Field of Classification Search
CPC ......... H04W 72/0453; H04W 72/1242; H04W 72/1273; H04W 72/1284; H04W 16/14; H04W 76/11; H04W 84/042; H04W 16/32; H04W 28/00; H04W 28/0205; H04W 28/0278; H04W 28/12; H04W 36/0011; H04W 36/0044; H04W 36/0072; H04L 5/0094; H04L 5/0044; H04L 5/0007; H04L 5/0037; H04L 5/0053; H04L 1/0026; H04L 1/1819; H04L 27/26; H04L 27/2602; H04L 27/2607; H04L 5/00; H04L 1/0004; H04L 1/0061; H04L 1/08; H04L 1/1812; H04L 1/1896; H04L 1/203; H04L 25/0226; H04L 27/30; H04L 43/0894

USPC ........................................................ 370/329
See application file for complete search history.

(56) References Cited

OTHER PUBLICATIONS

3GPP TSG RAN WG1 Meeting #86, R1-166752, "Discussion on grant-free/contention-based non-orthogonal multiple access"; Gothenburg, Sweden; Aug. 22-26, 2016; 5 pages.
3GPP TSG-RAN WG1 #86; R1-167255; "Procedure design for contention based access"; Gothenburg, Sweden; Aug. 22-26, 2016; 4 pages.
Office Action for European Application No. 16770922.9, dated Mar. 3, 2020, 8 pages.

* cited by examiner

US 10,966,243 B2

FLEXIBLE RESOURCE USAGE BETWEEN SCHEDULING-BASED AND CONTENTION-BASED RESOURCE ACCESS FOR WIRELESS NETWORKS

CROSS-REFERENCE TO RELATED APPLICATIONS

This application is a national stage entry of International Application No. PCT/EP2016/072662 filed Sep. 23, 2016, entitled "FLEXIBLE RESOURCE USAGE BETWEEN SCHEDULING-BASED AND CONTENTION-BASED RESOURCE ACCESS FOR WIRELESS NETWORKS" which is hereby incorporated by reference in its entirety.

TECHNICAL FIELD

This description relates to communications, and in particular, to a flexible resource usage between scheduled and contention-based resource access for wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, user devices or mobile stations are referred to as user equipments (UEs).

In some wireless networks, user devices or UEs may contend for resource access. When collisions occur between UEs, this can decrease reliability of a system.

SUMMARY

According to an example implementation, a method is provided for a flexible allocation of resources for a wireless network. The method includes determining, in a wireless network, a number of available resources for a category of user devices; determining a number of user devices, within the category of user devices, that are connected to the base station; determining whether the number of available resources for the category is greater than or equal to the number of connected user devices within the category of user devices; allocating resources to one or more user devices within the category of user devices using a scheduling-based resource allocation if the number of available resources for the category is greater than or equal to the number of connected user devices within the category of user devices; and otherwise, allocating resources to one or more user devices within the category of user devices using a contention-based resource allocation if the number of available resources for the category is less than the number of connected user devices within the category of user devices.

According to an example implementation, an apparatus includes at least one processor and at least one memory including computer instructions, when executed by the at least one processor, cause the apparatus to: determine, in a wireless network, a number of available resources for a category of user devices; determine a number of user devices, within the category of user devices, that are connected to the base station; determine whether the number of available resources for the category is greater than or equal to the number of connected user devices within the category of user devices; allocate resources to one or more user devices within the category of user devices using a scheduling-based resource allocation if the number of available resources for the category is greater than or equal to the number of connected user devices within the category of user devices; and otherwise, allocate resources to one or more user devices within the category of user devices using a contention-based resource allocation if the number of available resources for the category is less than the number of connected user devices within the category of user devices.

According to an example implementation, an apparatus includes means for determining, in a wireless network, a number of available resources for a category of user devices; means for determining a number of user devices, within the category of user devices, that are connected to the base station; means for determining whether the number of available resources for the category is greater than or equal to the number of connected user devices within the category of user devices; means for allocating resources to one or more user devices within the category of user devices using a scheduling-based resource allocation if the number of available resources for the category is greater than or equal to the number of connected user devices within the category of user devices; and means for, otherwise, allocating resources to one or more user devices within the category of user devices using a contention-based resource allocation if the number of available resources for the category is less than the number of connected user devices within the category of user devices.

According to an example implementation, a computer program product includes a computer-readable storage medium and storing executable code that, when executed by at least one data processing apparatus, is configured to cause the at least one data processing apparatus to perform a method including: determining, in a wireless network, a number of available resources for a category of user devices; determining a number of user devices, within the category of user devices, that are connected to the base station; determining whether the number of available resources for the category is greater than or equal to the number of connected user devices within the category of user devices; allocating resources to one or more user devices within the category of user devices using a scheduling-based resource allocation if the number of available resources for the category is greater than or equal to the number of connected user devices within the category of user devices; and otherwise, allocating resources to one or more user devices within the category of user devices using a contention-based resource allocation if the number of available resources for the category is less than the number of connected user devices within the category of user devices.

According to an example implementation, a method is provided for a flexible use of resources within a wireless network. The method includes using, by a user device within a category of user devices in a wireless network, either a scheduling-based resource access or a contention-based resource access, based on signals received from a base station, including: performing, by the user device, the following if the number of available resources for the category of user devices is greater than or equal to a number of connected user devices within the category of user devices: receiving, by the user device within the category of user devices, an uplink resource grant indicating an available resource; transmitting, by the user device to the base station, via the indicated available resource; and otherwise, performing, by the user device, the following if the number of available resources for the category of user devices is less than the number of connected user devices within the category of user devices: receiving, by the user device from the base station, a transmission diversity level; transmitting, via contention-based resource access, multiple instances of a data packet based on the transmission diversity level.

According to an example implementation, an apparatus includes at least one processor and at least one memory including computer instructions, when executed by the at least one processor, cause the apparatus to: use, by a user device within a category of user devices in a wireless network, either a scheduling-based resource access or a contention-based resource access, based on signals received from a base station, including: perform, by the user device, the following if the number of available resources for the category of user devices is greater than or equal to a number of connected user devices within the category of user devices: receive, by the user device within the category of user devices, an uplink resource grant indicating an available resource; transmit, by the user device to the base station, via the indicated available resource; and otherwise, perform, by the user device, the following if the number of available resources for the category of user devices is less than the number of connected user devices within the category of user devices: receive, by the user device from the base station, a transmission diversity level; transmit, via contention-based resource access, multiple instances of a data packet based on the transmission diversity level.

According to an example implementation, an apparatus includes means for using, by a user device within a category of user devices in a wireless network, either a scheduling-based resource access or a contention-based resource access, based on signals received from a base station, including: means for performing, by the user device, the following if the number of available resources for the category of user devices is greater than or equal to a number of connected user devices within the category of user devices: means for receiving, by the user device within the category of user devices, an uplink resource grant indicating an available resource; means for transmitting, by the user device to the base station, via the indicated available resource; and means for otherwise, performing, by the user device, the following if the number of available resources for the category of user devices is less than the number of connected user devices within the category of user devices, including: means for receiving, by the user device from the base station, a transmission diversity level; means for transmitting, via contention-based resource access, multiple instances of a data packet based on the transmission diversity level.

According to an example implementation, a computer program product includes a computer-readable storage medium and storing executable code that, when executed by at least one data processing apparatus, is configured to cause the at least one data processing apparatus to perform a method including: using, by a user device within a category of user devices in a wireless network, either a scheduling-based resource access or a contention-based resource access, based on signals received from a base station, including: performing, by the user device, the following if the number of available resources for the category of user devices is greater than or equal to a number of connected user devices within the category of user devices: receiving, by the user device within the category of user devices, an uplink resource grant indicating an available resource; transmitting, by the user device to the base station, via the indicated available resource; and otherwise, performing, by the user device, the following if the number of available resources for the category of user devices is less than the number of connected user devices within the category of user devices: receiving, by the user device from the base station, a transmission diversity level; transmitting, via contention-based resource access, multiple instances of a data packet based on the transmission diversity level.

The details of one or more examples of implementations are set forth in the accompanying drawings and the description below. Other features will be apparent from the description and drawings, and from the claims.

DETAILED DESCRIPTION

Figure 1:
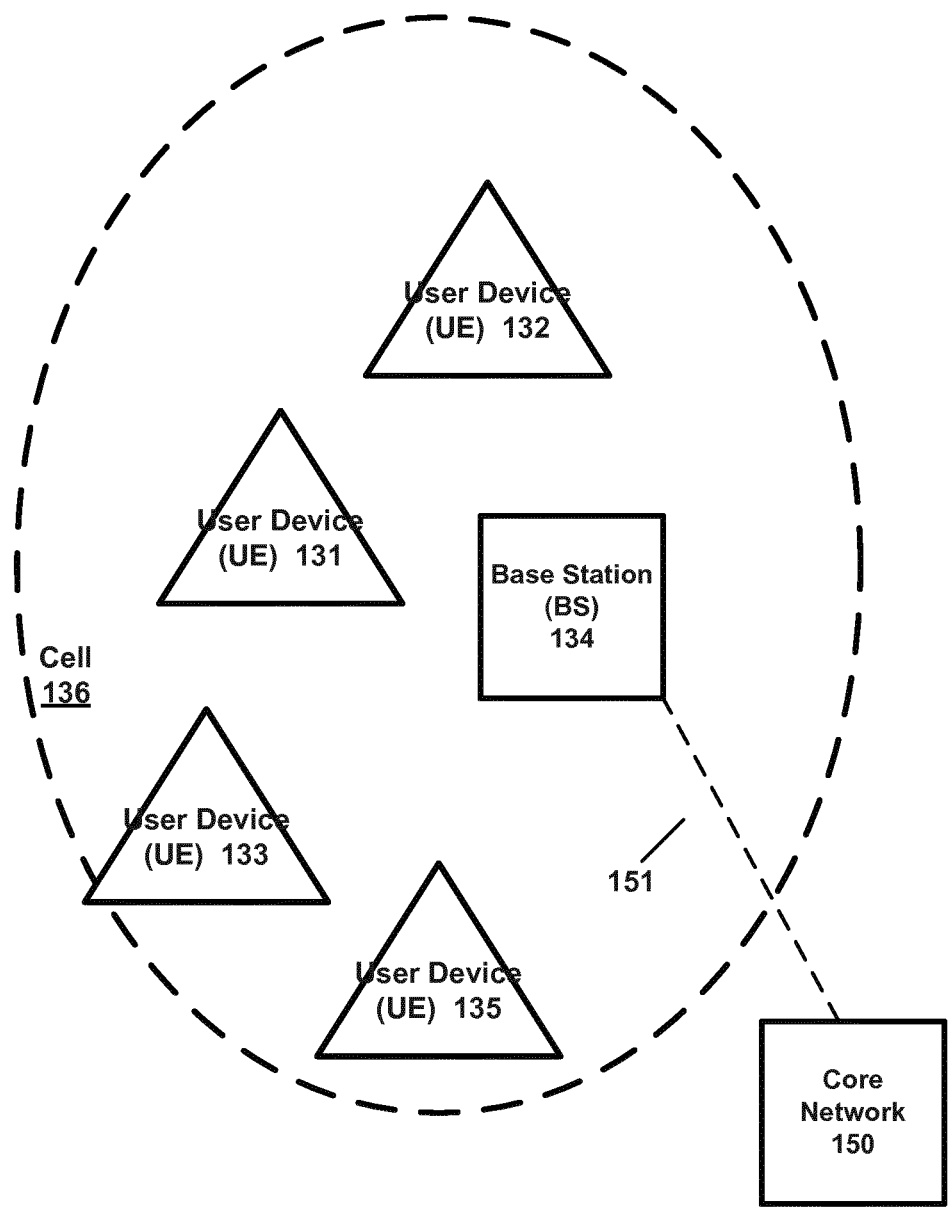
FIG. 1 is a block diagram of a wireless network according to an example implementation.

FIG. 1 is a block diagram of a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE) or mobile station) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

By way of illustrative example, the various example implementations or techniques described herein may be applied to various user devices, such as machine type communication (MTC) user devices, enhanced machine type communication (eMTC) user devices, Internet of Things (IoT) user devices, and/or narrowband IoT user devices. IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans.

Also, in an example implementation, a user device or UE may be a UE/user device with ultra reliable low latency communications (URLLC) applications. A cell (or cells) may include a number of user devices connected to the cell, including user devices of different types or different categories, e.g., including the categories of MTC, NB-IoT, URLLC, or other UE category.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies or wireless networks, such as LTE, LTE-A, 5G, cmWave, and/or mmWave band networks, IoT, MTC, eMTC, URLLC, etc., or any other wireless network or wireless technology. These example networks or technologies are provided only as illustrative examples, and the various example implementations may be applied to any wireless technology/wireless network.

The 5th Generation (5G) of wireless networks provides expansion of International Mobile Telecommunications (IMT) that go beyond those of IMT-2000 and IMT-Advanced mobile broadband (MBB) service, and also envisioning to address new services and use cases. These new services are not only for human interaction, but also a huge growth in machine-type communications (MTC) driven by e.g., factory automation and flexible process control. Another new use case is ultra reliable low latency communications (URLLC), which may require very high reliability and low latency.

According to an illustrative example, URLLC may, for example, require a reliability target or reliability requirement of 99.999% under the radio latency bound of 1 ms. Some example targets or requirements for URLLC may include a maximum packet error rate of $10^{-5}$, where maximum allowable radio latency, including retransmissions is down to 1 ms. This are merely some illustrative example performance targets (or requirements) and other numbers may be used. In the current LTE systems, the minimal resource unit (or Transmission Time Interval (TTI)) size is of 1 ms (e.g., where the TTI is a length of a subframe). A significant improvement in latency is possible for 5G networks, for example, with a new numerology for 5G of, for example, 0.125 ms TTI size and each TTI contains (or may contain) both control and data information.

According to an example implementation, one or more resource access techniques may be used to allow user devices in a cell or network to access or obtain uplink resources for uplink transmission. Two general resource allocation techniques may include scheduling-based resource access and contention-based resource access.

Scheduling-based resource allocation may include a BS (or other network device) allocating or scheduling uplink resources for a user device, or for each of a plurality of user devices. The BS may send an uplink resource grant (which may also be referred to as an uplink grant) that indicates uplink resource(s) that may be used by the user device to transmit uplink data to the BS. Therefore, in the case where scheduling-based resource allocation is used, there is a 0% probability of a collision with a transmission from another user device, because the BS has reserved or allocated this uplink resource only for the user device.

Contention-based resource allocation may include one or more user devices contending for access to a channel or wireless link, to allow the user device to transmit uplink to the BS. For example, a contention-based random access procedure may be used, e.g., where the user device may select a random access preamble index at random, and then transmit the random access preamble sequence to the BS. The BS may then transmit a random access response that includes an uplink grant. However, a collision may occur, since another user device may also have selected the same random access preamble index and transmitted the same random access preamble sequence to the BS. In such a case, two user devices may attempt to transmit on the uplink resource, which will typically cause a collision.

According to an example implementation, one way in which the reliability of contention-based transmissions can be improved is through the use of transmission diversity, in which the BS may instruct a user device to transmit each data packet during each of X consecutive or non-consecutive time periods (e.g., transmit the data/data packet in each of X subframes), where X may be 1, 2, 3, 4, 5, or other number. Thus, transmission diversity includes transmission of data multiple times, with a transmission of the data or data packet during each of X successive subframes or successive transmission opportunities, for example. Transmission diversity (or a transmission diversity level, referred to above as the number X) may be determined or selected by the BS, e.g., based on channel conditions of a wireless link between the user device and the BS and a load on (or usage of) contention resources. For example, a higher transmission diversity level (meaning a higher number of transmissions/retransmissions of the data or a data packet over X periods or subframes or transmission opportunities) may be used for a lower channel quality and/or higher interference (e.g., for a lower signal-to-interference plus noise ratio or SINR, or for a lower received signal strength or RSSI). Thus, more transmissions of a data packet may be used to increase the probability that the data (or data packet) will be successfully received by the BS. Transmission diversity may involve or include the transmission of a same data/data packet multiple times, or may include the transmission of different redundancy versions of a packet or data, which may be combined at the receiver. Thus, transmission diversity may include a user device transmitting multiple instances of a data or data packet (e.g., same data or different redundancy versions of the data) based on the transmission diversity level. Thus, for example, if 1 resource block is required to transmit a data packet, then 3 resource blocks (RBs) will be required to transmit the data packet during each of three different subframes, for a transmission diversity level=3 for a user device. According to an example implementation, for contention-based access, a different transmission diversity level may be used by each user device. Thus, while contention-based access cannot offer completely collision-free communications, the reliability of contention-based communication can be improved by transmission diversity (or by transmitting the data or data packet in each of multiple time periods, which may be consecutive or non-consecutive time periods).

Also, to improve reliability of uplink communications, the BS may allocate or schedule a resource (e.g., a resource block or multiple resource blocks) for each of multiple user devices in a cell, e.g., if there are sufficient resources to be allocated to each user device. As noted, a cell may include many different types of categories of user devices/UEs, e.g., IoT, MTC, eMTC, URLLC. In an illustrative example implementation, it is desirable, and in fact, may be required in some cases, to meet a specific reliability target (e.g., reliability of 99.999%, or other reliability target) for a category of user devices, such as for URLLC user devices in a cell. On the other hand, reliability requirements for other categories or types of user devices (e.g., IoT, MTC, . . . ) may be significantly less demanding than for the URLLC user devices. According to an example implementation, a user device/UE may have multiple applications and may have multiple service flows (e.g., a service flow(s) for each application on the user device/UE). A user device may have one or more URLLC service flows, and may have one or more other type/category of service flows. Thus, according to an example implementation, user devices with a URLLC application, a URLLC service flow or URLLC services may be referred to as a URLLC user device/UE.

Thus, according to an example implementation, a number of available resources in a network or cell (e.g., all available resources of the cell, or a subset of available resources of the cell to be allocated to the category of user devices) may be allocated or scheduled for the URLLC user devices. According to an example implementation, a scheduling-based resource allocation may be used in a cell if the number of available resources (e.g., number of resource blocks available per subframe or per TTI) in the cell is greater than the number of user devices within the category of user devices for the cell (e.g., the number of connected URLLC user devices within a cell). In other words, a scheduling-based resource allocation may be used in a cell if, for example, the number of available resources is sufficient to support URLLC user devices/UEs within the cell. For example, a data packet of a specific size may be transmitted via one resource block. A resource block may include Y subcarriers by Z timeslots, for example (e.g., such as 12 subcarriers by 1 time slot). And, in an illustrative example, there may be 6 resource blocks available per TTI or subframe (e.g., for allocation to connected URLLC user devices), and there may be 5 connected URLLC user devices in the cell. Thus, in this illustrative example, because the number of available resources in the cell (6 resource blocks per subframe) is greater than the number (5) of resources required by the connected URLLC user devices, the BS may use a scheduling-based resource allocation for the connected URLLC user devices. Thus, for example, in such a case, the BS may allocate or schedule one resource block per TTI or per subframe to each connected URLLC user device. In this manner, a very high reliability target may be reached, and in fact, a reliability close to 100% (at least in some cases) may be achieved, since no collisions would be expected for a scheduling-based resource allocation. On the other hand, a contention-based resource allocation may be used in the case where there are not sufficient resources as compared to the number of user devices within the category of user devices. For example, if the number of available resources in the cell (4 resource blocks per subframe, according to another example) is less than the number of connected URLLC user devices (5 connected URLLC user devices), the BS may then, for example, use a contention-based resource allocation for (one or more or even all of) the connected URLLC user device(s).

According to an example implementation, the BS or network may reserve a minimum number of resources (e.g., resource blocks or other quantity of resources) for URLLC service. In this case if the URLLC user device/UE population is less than the available resources, then scheduling-based resource access may be employed to provide a high (e.g., possibly up to 100%) reliability. On the other hand, in the case there are more URLLC user devices than available resources, it is necessary for the BS to allocate a minimum number of resources based on the input including number of URLLC user devices, traffic type and required reliability, and operate in a contention-based resource access. In this case, the BS can be operated in a more flexible way: scheduling-based resource access (when possible) for URLLC user devices, or a contention-based resource access for URLLC user devices.

As noted above, a BS may make a decision of whether to use a scheduling-based resource allocation or a contention-based resource allocation, e.g., based on a number (or amount) of available resources in the cell and a number of connected URLLC user devices. However, the decision between scheduling-based resource allocation and contention-based resource allocation may also (or alternatively) be based on (or take into account) other factors or criteria, such as, for example, traffic properties, such as one or more of the following traffic properties: the type of traffic (or data transmissions) within the cell, the priority of the traffic or data within the cell, the size and/or the amount of traffic within the cell. For example, if the amount of high-reliability traffic (requiring very high reliability) can be accommodated by all available resources or an allocated portion (which may be set aside for URLLC or high reliability traffic) of the available resources, then the BS may select scheduling-based resource allocation. Otherwise, if the available resources will likely be insufficient (e.g., by the BS considering resource requests for uplink transmission of high reliability traffic during one or more previous time periods) to accommodate or support the expected high reliability traffic, then the BS may select contention-based resource allocation.

Similarly, as noted, other factors or criteria, either alone or in combination, may be used by the BS in selecting one of the resource allocation techniques. As another example, if there is a very high volume of high priority/high reliability traffic, and/or which requires larger amounts of resources, e.g., more than one resource block (as compared to lower priority or lower reliability traffic), then the BS may select a contention-based resource allocation, e.g., if the available resources will likely be unable to accommodate the volume and/or sizes of the high priority or high reliability traffic/data packets.

One or more example implementations are directed to a flexible usage of resources in the UL communication while maintaining a reliable communication, e.g., such as for URLLC user devices. Two example options are available for UL resource allocation include: a pre-allocated (or scheduling-based) resource allocation for UL packet transmission or a contention-based resource allocation with some diversity scheme (e.g., use of diversity transmission) while maintaining the reliability requirements of the communication, e.g., URLLC. These two resource allocation techniques may be combined in flexible manner.

Figure 2:
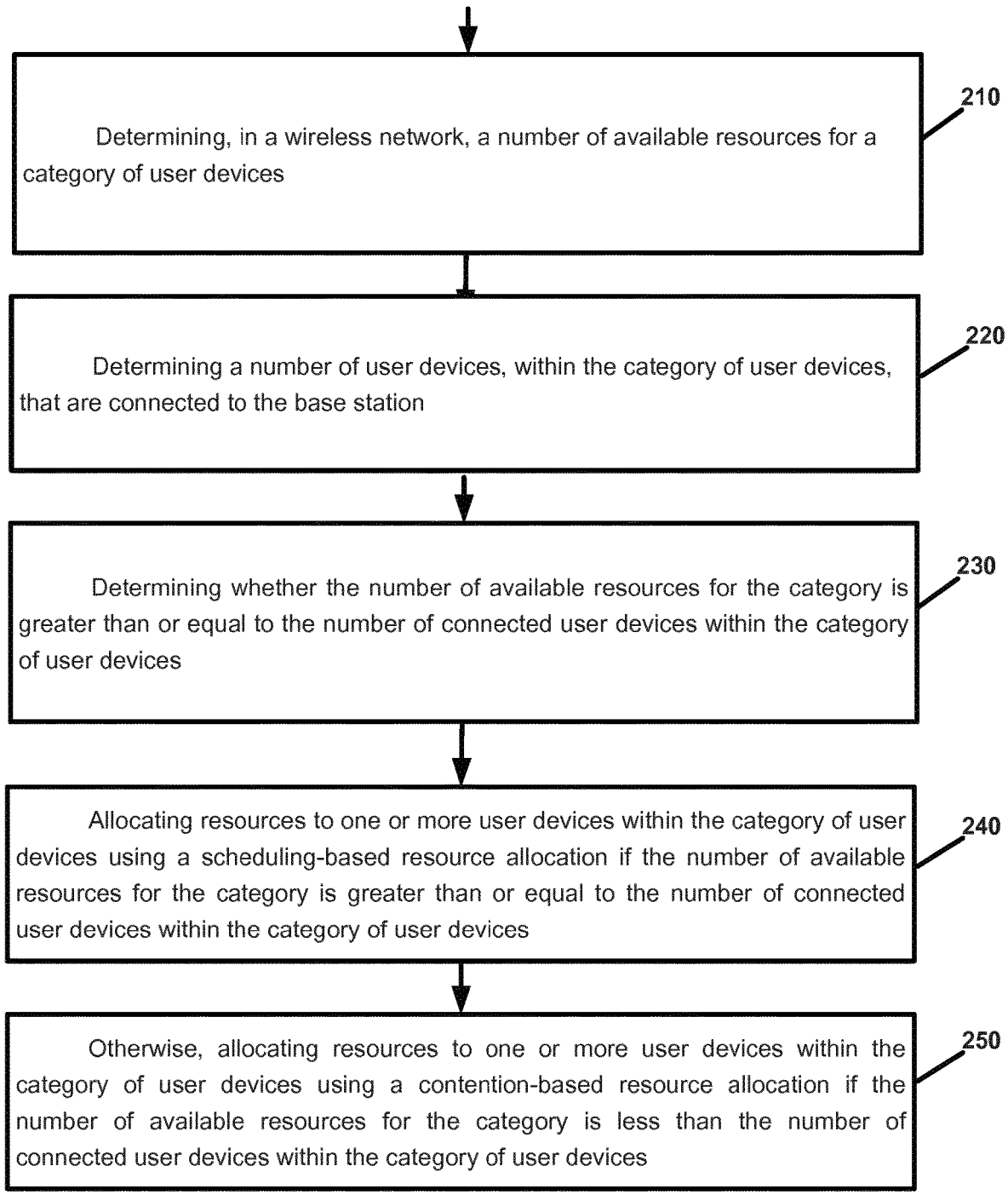
FIG. 2 is a flow chart illustrating operation of a base station or other network device(s) according to an example implementation.

FIG. 2 is a flow chart illustrating operation of a base station or other network device(s) according to an example implementation. FIG. 2 is directed to a method of flexible allocation of resources for a wireless network. Operation 210 includes determining, in a wireless network, a number of available resources for a category of user devices. Operation 220 includes determining a number of user devices, within the category of user devices, which are connected to a base station. Operation 230 includes determining whether the number of available resources for the category is greater than or equal to the number of connected user devices within the category of user devices. Operation 240 includes allocating resources to one or more user devices within the category of user devices using a scheduling-based resource allocation if the number of available resources for the category is greater than or equal to the number of connected user devices within the category of user devices. Operation 250 includes otherwise, allocating resources to one or more user devices within the category of user devices using a contention-based resource allocation if the number of available resources for the category is less than the number of connected user devices within the category of user devices. The operations of FIG. 2 may be performed by a BS and/or one or more other network devices, for example.

According to an example implementation of the method of FIG. 2, the category of user devices includes one or more ultra reliable low latency communications (URLLC) user devices.

According to an example implementation of the method of FIG. 2, the allocating resources to one or more user devices within the category of user devices using a scheduling-based resource allocation if the number of available resources for the category is greater than or equal to the number of connected user devices within the category of user devices includes: sending an uplink resource grant to allocate an available resource to a first user device within the category of user devices.

According to an example implementation of the method of FIG. 2, the allocating resources to one or more user devices within the category of user devices using a contention-based resource allocation if the number of available resources for the category is less than the number of connected user devices within the category of user devices includes: determining a traffic pattern for one or more of the connected user devices within the category of user devices; determining a reliability requirement for the category of user devices; determining a number of resources that are available for contention-based access; determining a transmission diversity level for one or more of the connected user devices within the category of user devices based on (one or more of) the number of connected user devices within the category of user devices, the traffic pattern for the one or more of the connected user devices, the number of available resources (e.g., the total number of resources in the cell, the number of resources available for contention-based access, or the number of resources available to URLLC user devices), and the reliability requirement and the number of resources that are available for contention-based access; and transmitting the transmission diversity level.

According to an example implementation of the method of FIG. 2, determining a traffic pattern may include: determining a packet arrival rate for one or more of the connected user devices within the category of user devices. The BS may determine the packet arrival rate, e.g., for each UE, e.g., based on packets received by the BS from one or more UEs, or based on other information. Alternatively, each UE may determine a packet arrival rate (based on packets received from an upper layer for uplink transmission) and then the UE reports this packet arrival rate to the BS. Thus, different techniques may be used to allow the BS to determine the traffic pattern (e.g., packet arrival rate) for one or more user devices/UEs within the cell.

According to an example implementation of the method of FIG. 2, the number of resources that are available for contention-based access includes a number of resource blocks within a transmission time interval that are available for contention-based access.

Figure 3:
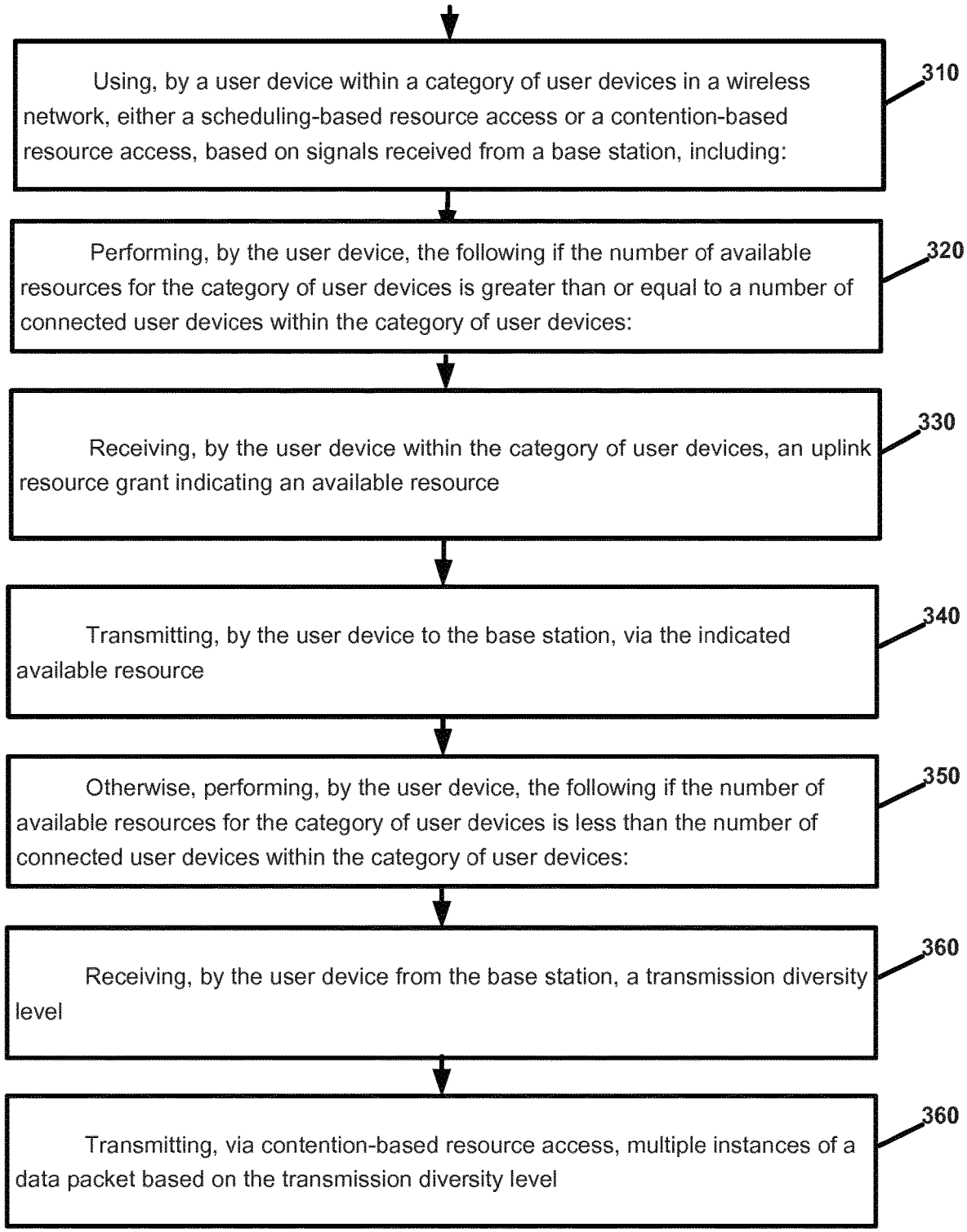
FIG. 3 is a flow chart illustrating operation of a user device according to an example implementation.

FIG. 3 is a flow chart illustrating operation of a user device according to an example implementation. The method illustrated in FIG. 3 is directed to a method of flexible use of resources within a wireless network. The method of FIG. 3 includes using (operation 310), by a user device within a category of user devices in a wireless network, either a scheduling-based resource access or a contention-based resource access, based on signals received from a base station, including: performing (operation 320), by the user device, the following if the number of available resources for the category of user devices is greater than or equal to a number of connected user devices within the category of user devices: receiving (operation 330), by the user device within the category of user devices, an uplink resource grant indicating an available resource; transmitting (operation 340), by the user device to the base station, via the indicated available resource; and otherwise, performing (operation 350), by the user device, the following if the number of available resources for the category of user devices is less than the number of connected user devices within the category of user devices: receiving (operation 360), by the user device from the base station, a transmission diversity level; transmitting (operation 370), via contention-based resource access, multiple instances of a data packet based on the transmission diversity level.

According to an example implementation of the method of FIG. 3, the category of user devices includes one or more ultra reliable low latency communications (URLLC) user devices, and wherein there is one or more user devices connected to the base station that are not within the category of user devices (e.g., eMTC, IoT or other user devices). Further details of one or more example implementations are described herein.

According to an example implementation, a flexible resource access scheme is provided for URLLC packet transmission. To be more specific, an example implementation may provide access UL resources in a flexible manner within a certain time window either with 1) Scheduling-based access, or 2) contention-based access.

By scheduling-based resource access (or scheduling-based resource allocation), this may include whenever a user device or UE is ready to send a data packet, the user device always transmits in a pre-allocated (or scheduled) access resource(s). Whereas in the contention-based resource access, the user device transmits in randomly selected access resource(s).

Figure 4:
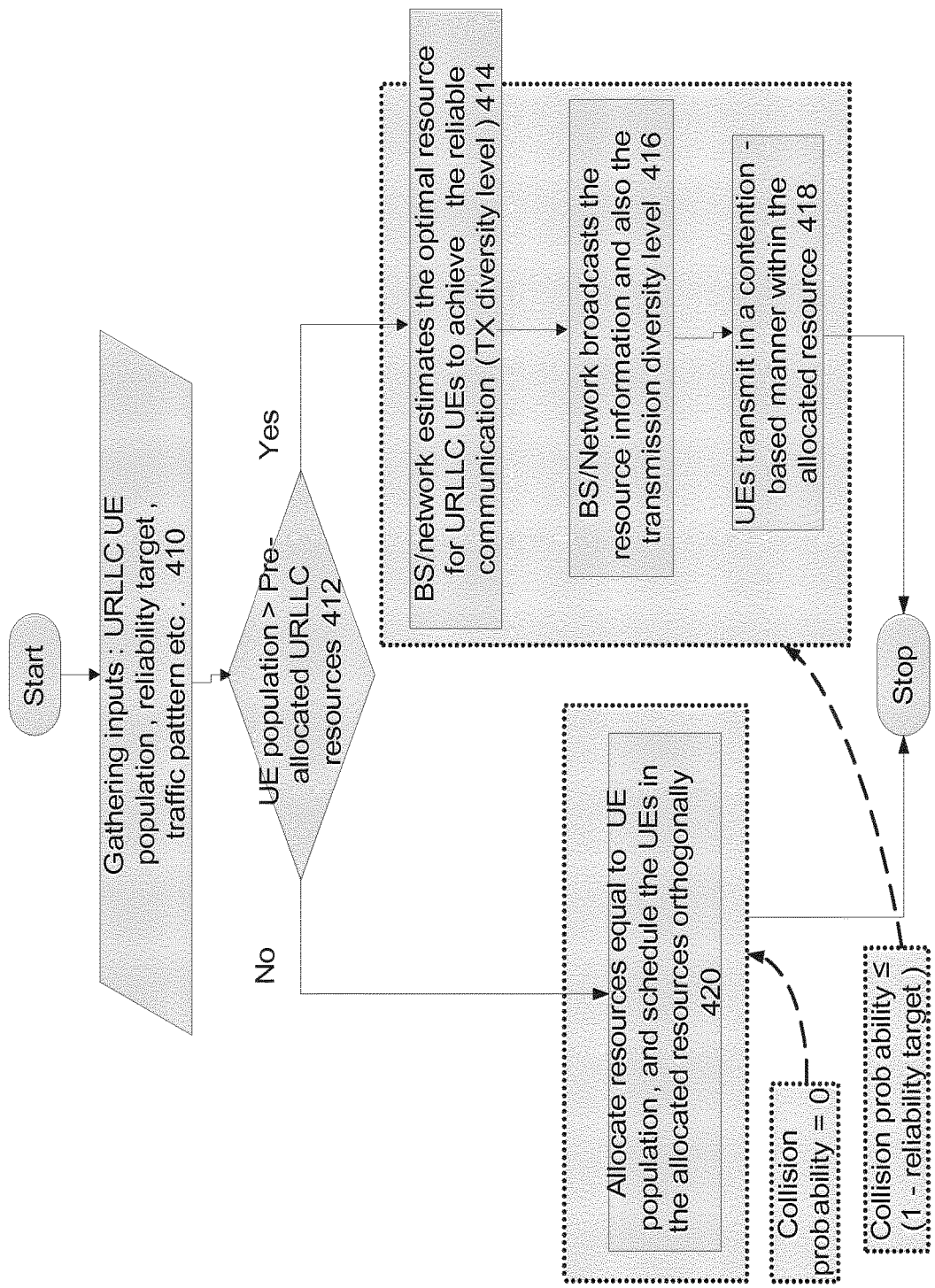
FIG. 4 is a diagram illustrating operation of a system according to an example implementation.

FIG. 4 is a diagram illustrating operation of a system according to an example implementation. At 410, initially, or at various points, the BS or network may obtain various data or inputs, such as, for example: the URLLC UE population (e.g., number of connected URLLC UEs for the cell or network), a number of resources for connected URLLC UEs (e.g., a number of resource blocks for a subframe or TTI), a reliability target (or requirement), such as 99.999% reliability, a traffic pattern (e.g., which may be defined by a packet arrival rate and/or packet size for the URLLC UEs, or for each of the URLLC UEs), etc.

There may be a certain amount of resources reserved for connected URLLC UEs/user devices (e.g., a certain number of resource blocks for a subframe or TTI). At 412, the BS may determine whether to use scheduling-based resource allocation or contention-based resource allocation, e.g., based on the number of available resources for URLLC UEs and the number of connected URLLC UEs.

At 412, if the URLLC UEs (or user device) population (number of URLLC UEs/user devices) is less than or equal to the amount of resources available for the URLLC UEs during a time instant (e.g., for a subframe or other time period), a network node (or BS) may schedule or pre-allocate (420) resources for each URLLC UE, e.g., by scheduling or pre-allocating access slot IDs (identifiers) for different URLLC UEs' transmissions. Then URLLC UEs may then transmit in their respective access slot ID (or their respective assigned or scheduled resource), and hence, will not result in any collisions with other UE transmissions. Thus, the scheduling-based resource allocation (or scheduling-based communication technique) provides orthogonal or separate uplink resources for scheduling-based resource allocation. As a result, the scheduling-based resource allocation may provide a highest (or at least higher) reliability (e.g., close to 100%, at least in some cases) for URLLC UEs/user devices (or other category of UEs), and thus, may be preferred if there are sufficient resources for a resource (e.g., resource block) to be scheduled or allocated for each connected URLLC UE, for example.

On the other hand, if the connected URLLC UE population is greater than the available resources during a time instant, then flow in FIG. 4 proceeds to blocks 414, 416 and 418, where contention-based transmission (or contention-based resource allocation) may be used. At 414, the BS may determine the transmission diversity for the URLLC UEs in the cell, or may determine individual transmission diversity level for each of one or more URLLC UEs in the cell. The BS may determine a transmission diversity level based on one or more of: the UE population (e.g., number of URLLC user devices/UEs) and type, the number of available resources, the traffic pattern (e.g., packet arrival rate from upper layers, and/or packet size, for each URLLC UE), the reliability target, etc. The transmission diversity may be, for example, understood as the transmission of the same data or data packet in successive transmission opportunities. At 416, the network node or BS then broadcasts the resource information (e.g., indicating a set of contention-based resources that may be used for transmission) and a transmission diversity level so that the URLLC UEs transmit the packets with the recommended transmission diversity level while contending for resources. At 418, one or more of the connected URLLC UEs transmit using a contention-based resource allocation technique within a set of indicated resources. With this flexible resource access, the packet collision probability is either zero or in accord with the URLLC reliability levels.

According to an example implementation, in case there is no pre-allocated resource for URLLC, the system becomes purely contention-based access for URLLC traffic. One or more example implementations may provide an efficient method to estimate the required resources based on number of URLLC UEs, traffic pattern and reliability requirements. For each UE, the number of required resources to transmit a data packet may be determined as: 1 resource (e.g., 1 resource block)*TX diversity level, since 1 resource (e.g., 1 resource block) may be used to transmit the data packet each time, and the quantity of transmissions for a data packet is defined by the transmission diversity level.

As shown in FIG. 4, the BS obtains information about the number of URLLC UEs, their traffic pattern (e.g., packet arrival rate at the UE from upper layers or applications on the UE with data to send) and a reliability target or requirement. For example, if there are pre-allocated resources for URLLC traffic, in case the number of URLLC UEs is less than or equal to the pre-allocated resources, in other words, the pre-allocated resources are sufficient to support URLLC UEs, the scheduling-based approach may be better, and may be used, which typically leads to zero collision probability. However, in case the pre-allocated resource is not sufficient for the quantity of connected URLLC UEs, the BS can determine the minimum number of resources (e.g., the transmission diversity) based on the input of URLLC UE population, traffic pattern and reliability requirement. Some example implementations of determining or estimating the number of resources for contention-based resource allocation is described below, by way of illustrative examples.

First, an example analysis of collision probability is described for the contention-based scenario in e.g., 5G systems providing services to N URLLLC UEs, where each UE, e.g., has an independent Poisson packet arrival with average number of packet arrivals in an interval is μ (packet arrival rate). The system has a bandwidth of equivalent K resource blocks (RBs), e.g., the number of available resources/RBs is K resource blocks. Then, the smallest resource unit available to a UE is a RB within a TTI. Henceforth, we assume a minimum RB is 1 RB×1 TTI unless and otherwise specified. And further it is assumed that one RB is sufficient to transmit the packet. UE selects RB randomly for its packet transmission out of K available RBs at the given time instant (it uses one RB out of K available RBs within a TTI).

Probability for one UE to have one or more packets to transmit in a TTI $P_{RACH,TTI}=P(x>0)=1-e^{-\mu}$.

Probability, the given RB is used by the UE is $$P_{RACH} = \frac{P_{RACH,TTI}}{K} = \frac{1-e^{-\mu}}{K}.$$

Now, there might be a possibility that the other (N−1) UEs try to access the above random access event. For example, those (N−1) complimentary UEs may be denoted as $N_c$. Probability that no other UE (from complimentary UEs) has one or more packets to transmit in the given TTI is $$P_0 = (1-P_{RACH,TTI})^{N_c}.$$

Probability that n UEs (from complimentary UEs) has a packet to transmit in the given TTI is $$P_n = \binom{N_c}{n} P_{RACH,TTI}^n (1 - P_{RACH,TTI})^{N_c - n}$$

where $$\binom{N_c}{n}$$

is the binomial coefficient, i.e., $$\binom{N_c}{n} = \frac{N_c!}{n!(N_c - n)!}.$$

Probability that these n UEs (from complimentary UEs) do not select the given RB (RB used by the UE in interest) in the given TTI is $$P_{acc_n^0} = \left(\frac{K-1}{K}\right)^n.$$

This means that these n UEs do not collide with the UE in interest, but may collide with themselves. Now the total probability of no collision between the UE in interest and other n=1, . . . , $N_c$ UEs is $$P_\Sigma = \sum_{n=1}^{N_c} P_n P_{acc_n^0}.$$

Then the collision probability $P_c$ of the UE in interest is $$P_c = 1 - P_0 - P_\Sigma,$$

or $$P_c = 1 - \left(\frac{e^{-\mu} + K - 1}{K}\right)^{N_c}.$$

If there is one UE, i.e., $N_c$=0, then from above equation $P_c$=0, which is true.

UEs can decrease collision probability $P_c$ by means of transmission diversity. In this case, a UE transmits the same packet in subsequent T TTIs. However again in every subsequent TTI, RB numbers are chosen randomly. With this, some packets may collide but some may be successful and this reduces the collision probability. For example, for a case with T=2 TTIs and K=6 RBs in these two TTIs, then there are 36 combinations available on which the UE can send its same packet twice in consecutive TTIs. For this, the new mean arrival and number of available resources in a TTI becomes μ→2μ, and K→$K^2$. Similarly, for a diversity with T TTIs, μ→Tμ, and K→$K^T$, and the new collision probability becomes $$P_{c,div-T} = 1 - \left(\frac{e^{-T\mu} + K^T - 1}{K^T}\right)^{N_c}.$$

The maximum number of UEs N that can be supported for URLLC 5G scenario, for example, can be found. The TTI length is assumed to be 0.125 ms, i.e., 8000 TTIs in one second. If the mean packet inter-arrival time is 10 seconds, then $$\mu = \frac{1}{8000 * 10}.$$

In URLLC, maximum allowable E2E latency is 1 ms (or 0.5 ms for UL), then $$T \leq \frac{0.5}{0.125},$$

i.e., T≤4 and for $P_{rel}$=99.999% reliability against collision, $P_c$=1-$P_{rel}$=0.00001. Now for bandwidth K=6 RBs, and $N_c$=N-1, the maximum number of UEs that are supported for URLLC is (by way of illustrative example, for the example parameters for this example):

TABLE 1

Maximum number of UEs that may be supported for different transmission diversity levels (T) for the example parameters.

| TX Diversity Level T | UEs N (e.g., no. of URLLC UEs) |
|---|---|
| 1 | 5 (<K = 6) |
| 2 | 15 |
| 3 | 58 |
| 4 | 260 |

Figure 5:
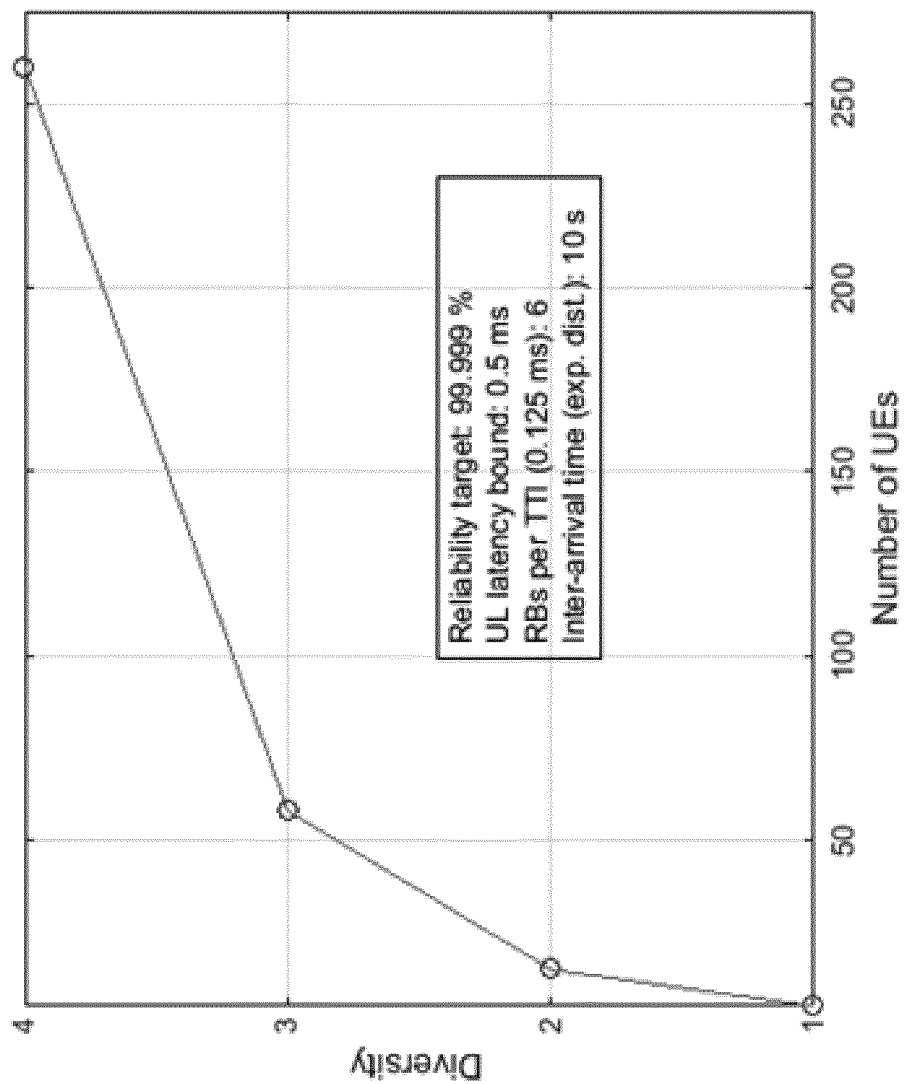
FIG. 5 is a diagram illustrating a number of UEs (X axis) vs. transmission diversity (Y axis).
Figure 6:
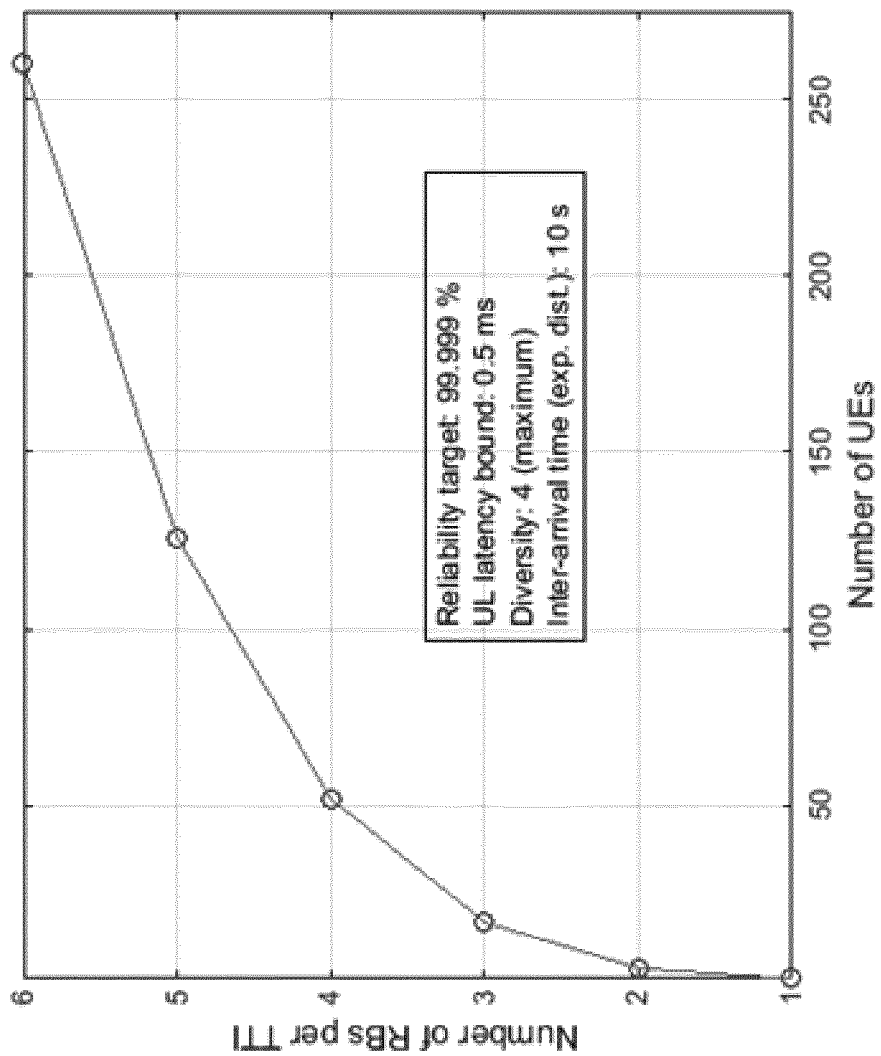
FIG. 6 is a diagram illustrating a number of UEs (X axis) vs. a number of resource blocks per TTI (Y axis).

FIG. 5 is a diagram illustrating a number of UEs (X axis) vs. transmission diversity (Y axis). As shown in FIG. 5, for a given reliability target, the maximum number of UEs that may be supported will increase as transmission diversity increases. FIG. 6 is a diagram illustrating a number of UEs (X axis) vs. a number of resource blocks per TTI (Y axis). As shown in FIG. 6, a larger number of available resources will result in a larger number of UEs that can be supported for a given reliability.

Now, the available RBs in each TTI for the provided analysis is assumed to be K=6, and however with transmission diversity level=1, a maximum number of UEs can be supported are 5 for 99.999% reliability against packet collision using contention based transmission. This is suboptimal. So if actual number of UEs $N_{actual}$ are less than or equal to K, i.e., $N_{actual}$≤K, then BS can, based on scheduling-based resource allocation, pre-allocate RB resource numbers to the UEs, and hence with this, the maximum number of UEs that can be supported are now 6 (N=K). And if $N_{actual}$>6, BS can opt for contention-based transmissions and with appropriate transmission diversity level.

So, the case with $N_{actual}>K$, BS can decide the transmission diversity level T accordingly $$T = \underset{T}{\arg} \min_{\{N \in N_{actual}\}} (N - N_{actual})$$

where $$N = 1 + \frac{\log P_{rel}}{\log \frac{e^{-T\mu} + K^T - 1}{K^T}}.$$

Note, in FIG. 4, in case of scheduling access, URLLC UEs are scheduled on RBs only if the UE population is less than K. And if more, then contention-based scheme is used with the optimal resource allocation equal to K*T, e.g., where K=minimum resource allocation, e.g., K RBs (such as 1 RB); whereas T=a number of transmissions for the data packet, so total allocated resources is (K*T) RBs.

Figure 7:
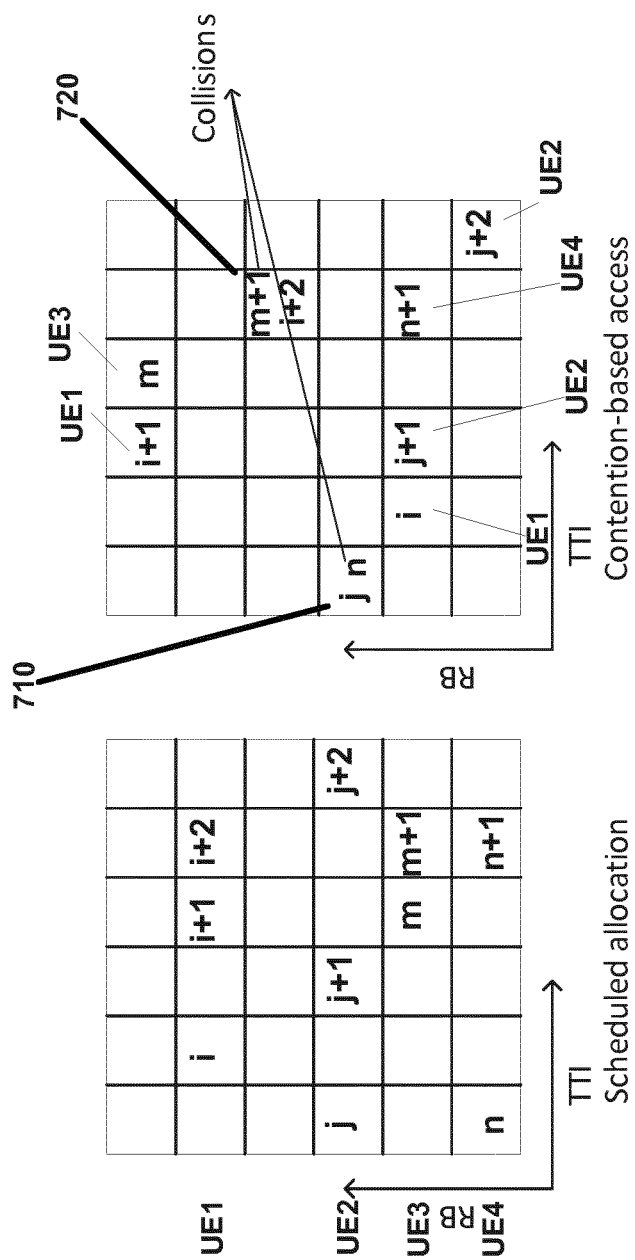
FIG. 7 is a diagram illustrating allocation of resources for the scheduling-based resource allocation and for a contention-based resource allocation.

FIG. 7 is a diagram illustrating allocation of resources for the scheduling-based resource allocation and for a contention-based resource allocation. On the left side, for the scheduling-based resource allocation, UE1 is allocated a same resource block (RB) for the transmission of packets i, i+1, and i+2, via respective TTIs (one TTI per packet); Similarly, a RB across multiple TTIs are allocated to UE2 for the transmission of data packets j, j+1, and j+2; a different RB across multiple TTIs are allocated to UE3 for the transmission of data packet m, and m+1; and, a RB across two TTIs are allocated for UE4 to transmit data packets n and n+1. On the right side, some collisions are shown in which two different UEs transmit data via a same RB/TTI combination. For example, at 710, a collision occurs between UE2's transmission of packet j and UE4's transmission of packet n. Similarly, at 720, a collision occurs between UE3's transmission of packet m+1 and UE1's transmission of packet i+2.

Figure 8:
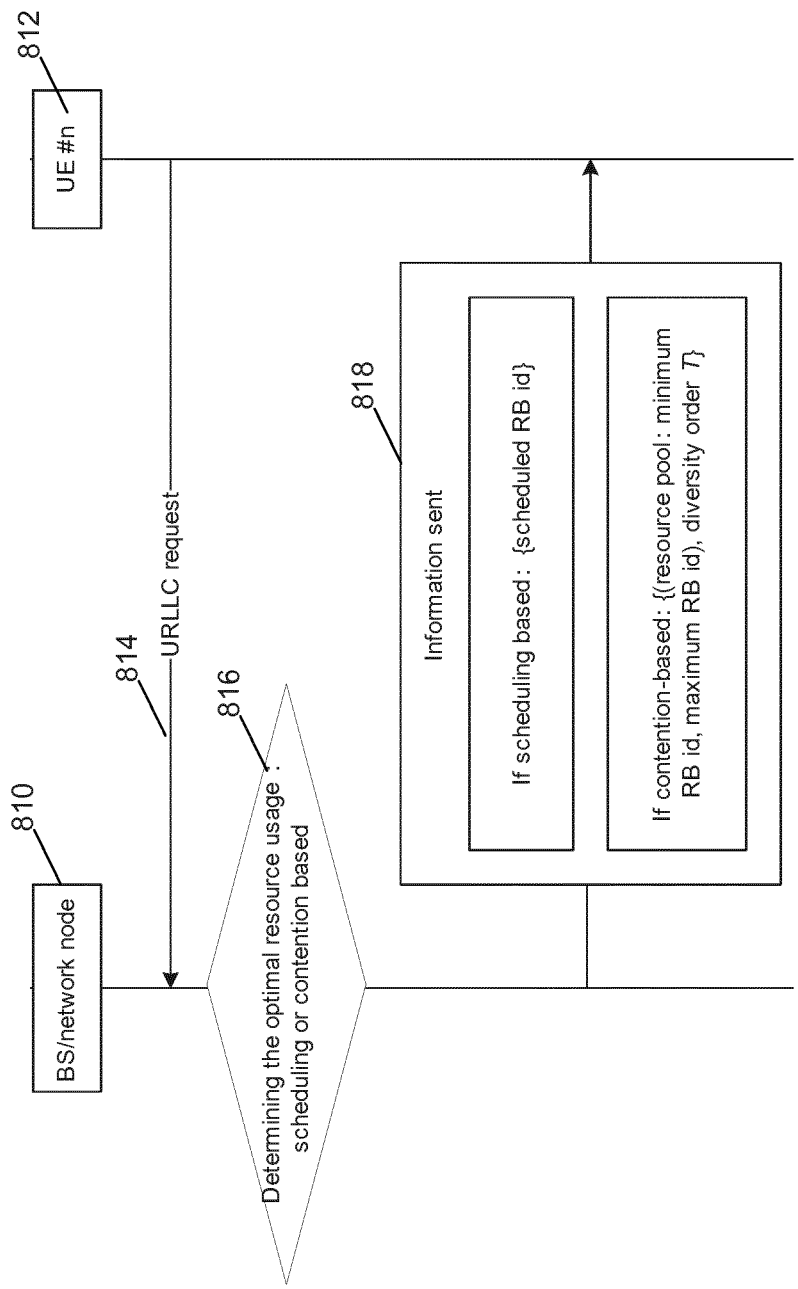
FIG. 8 is a flow chart illustrating operation of a system according to an example implementation.

FIG. 8 is a flow chart illustrating operation of a system according to an example implementation. A BS 810 is in communication with a UE 812. At 814, the UE 812 sends a URLLC resource request for uplink resources to BS 810. At 816, the BS 810 determines an optimal resource usage, including first determining whether a scheduling-based resource allocation or a contention-based resource allocation will be used. And then, if a contention-based resource allocation is selected, the BS 810 will determine a transmission diversity level. At 818, the BS 810 sends a scheduled RB to the UE 812, if a scheduling-based resource allocation is selected by the BS. And, at 818, the BS 810 sends an indication of the contention-based resources (e.g., a resource pool, such as by identifying a minimum RB ID, and a maximum RB ID). In an example implementation, the transmission diversity level may be the same for all URLLC UEs within a cell.

According to an example implementation, an apparatus includes at least one processor and at least one memory including computer instructions, when executed by the at least one processor, cause the apparatus to: determine, in a wireless network, a number of available resources for a category of user devices; determine a number of user devices, within the category of user devices, that are connected to the base station; determine whether the number of available resources for the category is greater than or equal to the number of connected user devices within the category of user devices; allocate resources to one or more user devices within the category of user devices using a scheduling-based resource allocation if the number of available resources for the category is greater than or equal to the number of connected user devices within the category of user devices; and otherwise, allocate resources to one or more user devices within the category of user devices using a contention-based resource allocation if the number of available resources for the category is less than the number of connected user devices within the category of user devices.

According to an example implementation of the apparatus, the category of user devices includes one or more ultra reliable low latency communications (URLLC) user devices.

According to an example implementation of the apparatus, causing the apparatus to allocate resources to one or more user devices within the category of user devices using a scheduling-based resource allocation if the number of available resources for the category is greater than or equal to the number of connected user devices within the category of user devices includes causing the apparatus to: send, by a base station, an uplink resource grant to allocate an available resource to a first user device within the category of user devices.

According to an example implementation of the apparatus, causing the apparatus to allocate resources to one or more user devices within the category of user devices using a contention-based resource allocation if the number of available resources for the category is less than the number of connected user devices within the category of user devices comprises: causing the apparatus to determine a traffic pattern for one or more of the connected user devices within the category of user devices; causing the apparatus to determine a reliability requirement for the category of user devices; causing the apparatus to determine a number of resources that are available for contention-based access; causing the apparatus to determine a transmission diversity level for one or more of the connected user devices within the category of user devices based on the number of connected user devices within the category of user devices, the traffic pattern for the one or more of the connected user devices, and the reliability requirement; and causing the apparatus to transmit the transmission diversity level.

According to an example implementation of the apparatus, causing the apparatus to determine a traffic pattern includes causing the apparatus to determine a packet arrival rate for one or more of the connected user devices within the category of user devices.

According to an example implementation of the apparatus, the number of resources that are available for contention-based access includes a number of resource blocks within a transmission time interval that are available for contention-based access.

According to an example implementation, an apparatus includes means (e.g., 902A/902B and/or 904, FIG. 9) for determining, in a wireless network, a number of available resources for a category of user devices; means (e.g., 902A/902B and/or 904, FIG. 9) for determining a number of user devices, within the category of user devices, that are connected to the base station; means (e.g., 902A/902B and/or 904, FIG. 9) for determining whether the number of available resources for the category is greater than or equal to the number of connected user devices within the category of user devices; means (e.g., 902A/902B and/or 904, FIG. 9) for allocating resources to one or more user devices within the category of user devices using a scheduling-based resource allocation if the number of available resources for the category is greater than or equal to the number of connected user devices within the category of user devices; and means (e.g., 902A/902B and/or 904, FIG. 9) for, otherwise, allocating resources to one or more user devices within the category of user devices using a contention-based resource allocation if the number of available resources for the category is less than the number of connected user devices within the category of user devices.

According to an example implementation, a computer program product includes a computer-readable storage medium and storing executable code that, when executed by at least one data processing apparatus, is configured to cause the at least one data processing apparatus to perform a method including: determining, in a wireless network, a number of available resources for a category of user devices; determining a number of user devices, within the category of user devices, that are connected to the base station; determining whether the number of available resources for the category is greater than or equal to the number of connected user devices within the category of user devices; allocating resources to one or more user devices within the category of user devices using a scheduling-based resource allocation if the number of available resources for the category is greater than or equal to the number of connected user devices within the category of user devices; and otherwise, allocating resources to one or more user devices within the category of user devices using a contention-based resource allocation if the number of available resources for the category is less than the number of connected user devices within the category of user devices.

According to an example implementation, an apparatus includes at least one processor and at least one memory including computer instructions, when executed by the at least one processor, cause the apparatus to: use, by a user device within a category of user devices in a wireless network, either a scheduling-based resource access or a contention-based resource access, based on signals received from a base station, including: perform, by the user device, the following if the number of available resources for the category of user devices is greater than or equal to a number of connected user devices within the category of user devices: receive, by the user device within the category of user devices, an uplink resource grant indicating an available resource; transmit, by the user device to the base station, via the indicated available resource; and otherwise, perform, by the user device, the following if the number of available resources for the category of user devices is less than the number of connected user devices within the category of user devices: receive, by the user device from the base station, a transmission diversity level; transmit, via contention-based resource access, multiple instances of a data packet based on the transmission diversity level.

According to an example implementation, an apparatus includes means (e.g., 902A/902B and/or 904, FIG. 9) for using, by a user device within a category of user devices in a wireless network, either a scheduling-based resource access or a contention-based resource access, based on signals received from a base station, including: means (e.g., 902A/902B and/or 904, FIG. 9) for performing, by the user device, the following if the number of available resources for the category of user devices is greater than or equal to a number of connected user devices within the category of user devices: means (e.g., 902A/902B and/or 904, FIG. 9) for receiving, by the user device within the category of user devices, an uplink resource grant indicating an available resource; means (e.g., 902A/902B and/or 904, FIG. 9) for transmitting, by the user device to the base station, via the indicated available resource; and means (e.g., 902A/902B and/or 904, FIG. 9) for otherwise, performing, by the user device, the following if the number of available resources for the category of user devices is less than the number of connected user devices within the category of user devices, including: means (e.g., 902A/902B and/or 904, FIG. 9) for receiving, by the user device from the base station, a transmission diversity level; means (e.g., 902A/902B and/or 904, FIG. 9) for transmitting, via contention-based resource access, multiple instances of a data packet based on the transmission diversity level.

According to an example implementation, a computer program product includes a computer-readable storage medium and storing executable code that, when executed by at least one data processing apparatus, is configured to cause the at least one data processing apparatus to perform a method including: using, by a user device within a category of user devices in a wireless network, either a scheduling-based resource access or a contention-based resource access, based on signals received from a base station, including: performing, by the user device, the following if the number of available resources for the category of user devices is greater than or equal to a number of connected user devices within the category of user devices: receiving, by the user device within the category of user devices, an uplink resource grant indicating an available resource; transmitting, by the user device to the base station, via the indicated available resource; and otherwise, performing, by the user device, the following if the number of available resources for the category of user devices is less than the number of connected user devices within the category of user devices: receiving, by the user device from the base station, a transmission diversity level; transmitting, via contention-based resource access, multiple instances of a data packet based on the transmission diversity level.

Figure 9:
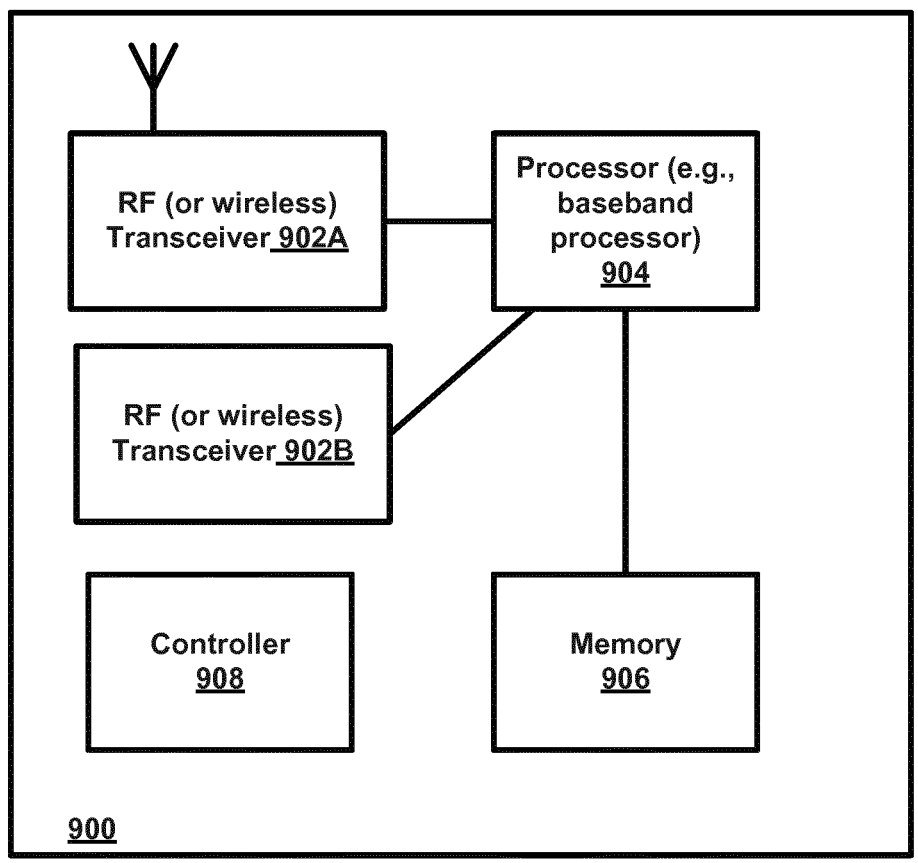
FIG. 9 is a block diagram of a node or wireless station (e.g., network device, base station/access point or mobile station/user device/UE) according to an example implementation.

FIG. 9 is a block diagram of a wireless station (e.g., AP or user device) 900 according to an example implementation. The wireless station 900 may include, for example, one or two RF (radio frequency) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

According to another example implementation, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD- ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. A method of flexible allocation of resources for a wireless network, the method comprising:
   determining, in a wireless network, a number of available resources for a category of user devices;
   determining a number of user devices, within the category of user devices, that are connected to a base station;
   determining whether the number of available resources for the category is greater than or equal to the number of connected user devices within the category of user devices;
   allocating the available resources to one or more user devices within the category of user devices using a scheduling-based resource allocation if the number of available resources for the category is greater than or equal to the number of connected user devices within the category of user devices; and
   otherwise, allocating the available resources to one or more user devices within the category of user devices using a contention-based resource allocation if the number of available resources for the category is less than the number of connected user devices within the category of user devices.

2. The method of claim 1 wherein the category of user devices comprises one or more ultra-reliable low latency communications (URLLC) user devices.

3. The method of claim 1 wherein the allocating the available resources to one or more user devices within the category of user devices using a scheduling-based resource allocation if the number of available resources for the category is greater than or equal to the number of connected user devices within the category of user devices comprises:
   sending, by the base station, an uplink resource grant to allocate an available resource to a first user device within the category of user devices.

4. The method of claim 1 wherein the allocating the available resources to one or more user devices within the category of user devices using a contention-based resource allocation if the number of available resources for the category is less than the number of connected user devices within the category of user devices comprises:
   determining a traffic pattern for one or more of the connected user devices within the category of user devices;
   determining a reliability requirement for the category of user devices;
   determining a number of resources that are available for contention-based access;
   determining a transmission diversity level for one or more of the connected user devices within the category of user devices based on the number of connected user devices within the category of user devices, the traffic pattern for the one or more of the connected user devices, and the reliability requirement; and
   transmitting the transmission diversity level.

5. The method of claim 4 wherein determining a traffic pattern comprises:
   determining a packet arrival rate for one or more of the connected user devices within the category of user devices.

6. The method of claim 4 wherein the number of resources that are available for contention-based access comprises a number of resource blocks within a transmission time interval that are available for contention-based access.

7. A computer program product for a computer, comprising software code portions for performing the steps of claim 1 when said product is run on the computer.

8. A method of flexible use of resources within a wireless network, the method comprising:
   using, by a user device within a category of user devices in a wireless network, either a scheduling-based resource access or a contention-based resource access, based on signals received from a base station, including:
   performing, by the user device, the following if a number of available resources for the category of user devices is greater than or equal to a number of connected user devices within the category of user devices:
   receiving, by the user device within the category of user devices, an uplink resource grant indicating an available resource; and
   transmitting, by the user device to the base station, via the indicated available resource; and
   otherwise, performing, by the user device, the following if the number of available resources for the category of user devices is less than the number of connected user devices within the category of user devices:
   receiving, by the user device from the base station, a transmission diversity level; and
   transmitting, via contention-based resource access using the available resources, multiple instances of a data packet based on the transmission diversity level.

9. The method of claim 8 wherein the category of user devices comprises one or more ultra reliable low latency communications (URLLC) user devices, and wherein there is one or more user devices connected to the base station that are not within the category of user devices.

10. A computer program product for a computer, comprising software code portions for performing the steps of claim 8 when said product is run on the computer.

11. An apparatus comprising at least one processor and at least one memory including computer instructions that, when executed by the at least one processor, cause the apparatus to:
   use, by a user device within a category of user devices in a wireless network, either a scheduling-based resource access or a contention-based resource access, based on signals received from a base station, including:
   perform, by the user device, the following if a number of available resources for the category of user devices is greater than or equal to a number of connected user devices within the category of user devices:
      receive, by the user device within the category of user devices, an uplink resource grant indicating an available resource; and
      transmit, by the user device to the base station, via the indicated available resource; and
   otherwise, perform, by the user device, the following if the number of available resources for the category of user devices is less than the number of connected user devices within the category of user devices:
      receive, by the user device from the base station, a transmission diversity level; and
      transmit, via contention-based resource access using the available resources, multiple instances of a data packet based on the transmission diversity level.

12. The apparatus of claim 11 wherein the category of user devices comprises one or more ultra reliable low latency communications (URLLC) user devices.

13. The apparatus of claim 11 wherein there is one or more user devices connected to the base station that are not within the category of user devices.

* * * * *